April 12, 1938.  A. H. HOTOPP, JR  2,113,961
ELECTROSTATIC CONDENSER
Filed Aug. 16, 1935
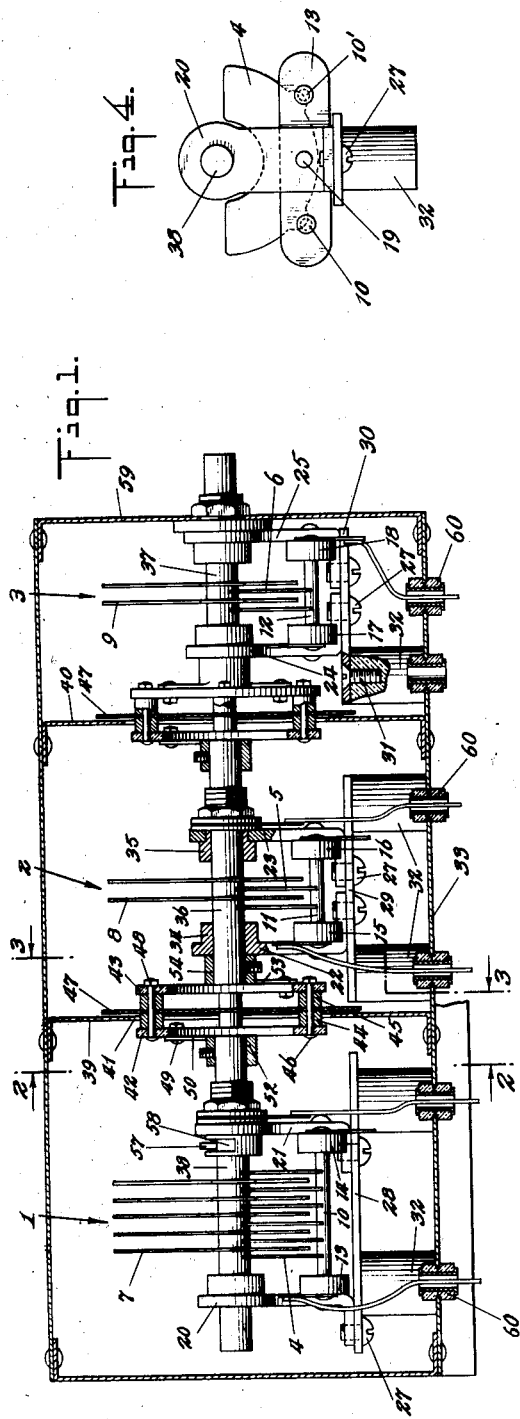
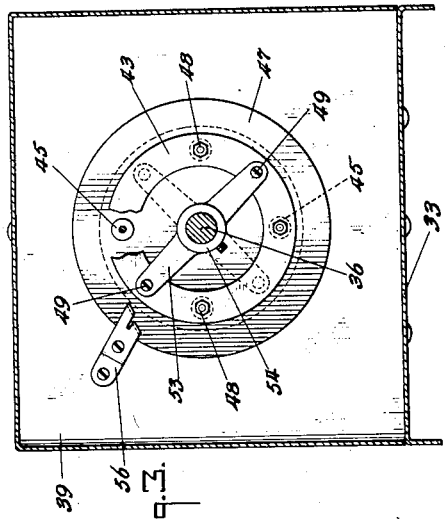
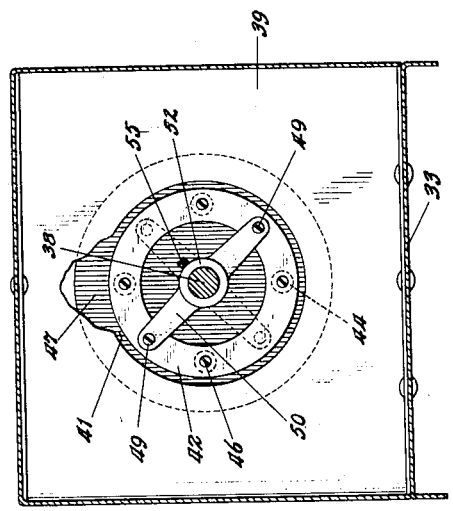
Alfred H. Hotopp Jr.
INVENTOR
BY John J. Rogan
ATTORNEY Patented Apr. 12, 1938

2,113,961

UNITED STATES PATENT OFFICE 2,113,961

ELECTROSTATIC CONDENSER

Alfred H. Hotopp, Jr., Caldwell, N. J., assignor to Hygrade Sylvania Corporation, Salem, Mass., a corporation of Massachusetts Application August 16, 1935, Serial No. 36,450

10 Claims. (Cl. 175—41.5)

This invention relates to electrostatic condensers and more particularly to condensers of the multi-unit gang type.

A principal object of the invention is to provide a gang condenser wherein the individual units are completely shielded electrostatically from each other.

A feature of the invention relates to a variable condenser having a plurality of separate sections or units arranged for adjustment from a common shaft each unit being enclosed in a separate electrostatic shielding compartment together with an improved arrangement for mechanically coupling the variable elements of the units together.

Another feature relates to a multi-unit gang condenser having the units electrically insulated and electrostatically shielded from each other but adjustable from a common shaft both the fixed and variable elements of the units having a minimum of electrostatic capacity to ground.

A further feature relates to the novel organization, arrangement and relative location of parts which constitute an improved gang condenser.

In the drawing, which illustrates one preferred embodiment of the invention,

Fig. 1 is a plan of a gang condenser according to the invention, with part of the enclosing housing removed for the sake of clarity.

Fig. 2 is a vertical sectional view taken along the line 2—2 of Fig. 1.

Fig. 3 is another vertical sectional view taken along the line 3—3 of Fig. 1.

Fig. 4 is a detail of the stator supporting means.

Referring to the drawing, the condenser is shown as consisting of three separate sections or units designated generally by the numerals 1, 2, and 3, each unit including a set of fixed or stator plates 4, 5, and 6 respectively and an interleaved set of adjustable or rotor plates 7, 8, and 9 respectively. Each set of stator plates is rigidly affixed in any suitable manner to the corresponding metal rods 10—10, 11—11, 12—12, each pair of rods being in turn supported by a pair of insulator blocks 13—14, 15—16, 17—18. These insulator blocks may be of any suitable insulating material but are preferably of porcelain, Lavite or similar ceramic material and are fastened as for example by rivets 19 to L-shaped metal brackets 20, 21, 22, 23, 24, and 25. These brackets are fastened by screws 27 to respective metal cross pieces 28, 29, and 30 which in turn are fastened by screws 31 to insulator posts 32 preferably of ceramic insulating material which may be fastened in any convenient manner to the base 33 of the enclosing housing. As shown more clearly in connection with brackets 22, 23, each bracket carries bearing members 34, 35 for the respective condenser shafts. Thus the rotor plates 8 of condenser unit 2 are rigidly fastened to the metal shaft 36, the rotor plates 9 are fastened to a similar shaft 37, and rotor plates 7 are fastened to shaft 38. The shafts 36, 37 and 38 are mechanically coupled together and are insulated from each other by special coupling members shown in detail in Figs. 2 and 3.

For the purpose of electrostatically shielding each condenser unit from the remaining units the said units are mounted within a metallic box or housing, the front and back covers of this box being omitted from Fig. 1 for the purpose of clarity. The box is divided into compartments by transverse metal walls 39, 40, each wall having a circular cutout portion 41 to receive the insulating-coupling members according to the invention. Each of these latter members comprises a pair of rings 42, 43 of Bakelite, fiber, or similar insulating material, the rings being held in spaced relation by suitable washers 44, 45 through which pass fastening bolts 46. Positioned between the washers 44 and the washers 45 is a metal disc 47 which is of slightly larger diameter than the opening 41, the rings and disc being held in place by the bolts 46 and the fastening nuts 48. Attached to ring 42 by screws 49 is a metal bridge 50 carrying integrally therewith a metal hub 52. A similar metal bridge 53 is attached to ring 43 and carries a metal hub 54. Both hubs 52 and 54 are adapted to be fastened to the opposed ends of the shafts 36, 38 and 36, 37 by set screws 55 the coupling members being fastened so that the metal discs 47 are as close as possible to the associated walls 39, 40 so as to form as nearly as possible a complete electrostatic shield for the openings 41. It should be noted that the bridge members 50 and 53 are preferably mounted at right angles to each other so that when the bolts 46 are assembled, the bridge members are not short circuited. In order to insure good electrical continuity between the housing and the shield discs 47, metal brushes or wipers 56 may be fastened to the wall partitions 39, 40, these brushes having their free ends bearing against the faces of the associated discs as shown in detail in Fig. 3. If desired, each shaft 36, 37, 38 may be provided with a pin 57 co-operating with a corresponding peripheral slot 58 in the bearing member to limit the angular movement of the rotor plates. It will be noted that the shaft 37 extends outwardly beyond the end wall 59 of the housing to provide means for adjusting all the condenser units exteriorly of the housing.

With the arrangement described and shown, each condenser unit is substantially completely electrostatically shielded from the remaining units, and both the rotor plates and the stator plates of each unit are insulated from one another, from the associated shaft and from the enclosing housing. By the particular manner of mounting the stator and rotor plates, the capacity of the various parts of the condenser units to ground or to the housing is reduced to a minimum. In order that each condenser unit may be connected in a suitable circuit independently from the remaining units, each set of rotor plates and each set of stator plates is provided with a separate connecting wire as shown in Fig. 1 these wires being brought out through suitable insulator bushings 60 in the base 33 of the housing as shown. While the drawing shows a three-stage gang condenser, it will be understood that a greater or less number of stages may be employed without departing from the spirit and scope of the invention. Furthermore while the drawing shows the first condenser unit as having a greater number of plates than the second and third units, it will be understood that this is done merely for illustrative purposes. For example, the first unit may be used as a tuning unit in any well known tuning arrangement, while the second and third condenser units may be coupling units.

What I claim is:

1. In combination a plurality of condenser units of the variable type, a metallic housing for said units, means dividing said housing into compartments each containing one of said units, means to insulate the units electrically from each other while mechanically coupling them together, said dividing means having an opening through which said insulating means passes, and closure means for said opening to shield electrostatically said units from each other said closure means including a rotatable electrostatic shield.

2. In combination a plurality of condenser units of the variable type, metallic shielding compartments for each of said units and provided with a metallic dividing wall, each of said units having a metal rotatable shaft terminating short of the associated dividing wall, insulating couplings for connecting the said shafts in tandem, said couplings extending through an opening in said wall, and means rotatable with each coupling and adjacent said opening for completing the electrostatic shielding of the adjacent units.

3. In combination a plurality of condenser units of the variable type, metallic shielding compartments for each of said units and provided with a metallic dividing wall, a conductive rotatable adjusting shaft for each unit terminating short of the associated dividing wall, an insulating coupling member extending from one compartment to another compartment to couple said shafts mechanically, and a metal shield rotatable with said coupling member to complete the electrostatic shielding of the portions of the compartments through which said coupling member extends.

4. In combination a plurality of condenser units each having a rotor member and a stator member, means to couple insulatingly the rotor members together for simultaneous operation, a dividing wall through which the insulating coupling passes, and an electrostatic shield between the units and rotatable with said coupling means to complete the shielding of the part of the dividing wall through which said coupling passes.

5. The combination according to claim 4 in which the coupling means comprises a pair of insulator rings each fastened to an associated one of the rotor members, and the shield is in the form of a metal disc fastened to said rings but insulated from said rotor members.

6. In combination a plurality of condenser units each having a rotor member and a stator member, and means for insulatingly coupling said rotor members for simultaneous operation comprising a pair of insulator rings, a rotatable metal disc on opposite sides of which said rings are fastened and a connection from each ring to an associated one of the rotor members, and housing compartments for the units cooperating with said disc to complete the electrostatic shielding of said units.

7. The combination according to claim 6 in which the condenser units are insulatingly mounted within separate metallic compartments and said coupling member extends from one compartment to another with the said disc mounted to complete the electrostatic shielding of the portion of the compartment through which said coupling member passes.

8. In combination a condenser of the type having a fixed plate and a movable plate, a metallic compartment for electrostatically shielding said condenser, a member for adjusting the movable plate, an opening in the wall of said compartment through which said member passes, a metal shaft on which the movable plate of the condenser is carried said shaft terminating short of said opening, an insulator coupling means between said member and said shaft and passing through said opening, and a metal disc adjacent said opening and rotatable with said coupling member to complete the electrostatic shielding of the condenser.

9. The combination according to claim 8 in which the metal disc is mounted adjacent said opening and a brush is fixed to a wall of said housing and contacts with said disc.

10. An electrostatic condenser of the tandem ganged unit type each unit having a rotatable metal shaft carrying a condenser plate, and means to isolate the units electrostatically from each other, the last-mentioned means including means to fasten successive units with their shafts in spaced end-on relation, a metal wall interposed between the opposed shaft ends, but out of contact therewith, an insulator coupling mechanically connecting the said opposed ends and passing through an opening in said wall, and a disc rotatable with said coupling adjacent said opening to complete the electrostatic shielding effect of said wall.

ALFRED H. HOTOPP, Jr.